Sept. 3, 1940.　　　　R. D. SEMON　　　　2,213,617
ROTARY TRANSMISSION OR BRAKE

Filed Aug. 5, 1939　　　　2 Sheets-Sheet 1

INVENTOR
RUSSELL D. SEMON
BY
Boyken & Mohler
ATTORNEY

Sept. 3, 1940. R. D. SEMON 2,213,617
ROTARY TRANSMISSION OR BRAKE
Filed Aug. 5, 1939 2 Sheets-Sheet 2

INVENTOR
RUSSELL D. SEMON
BY Boyken & Mohler
ATTORNEY

Patented Sept. 3, 1940

2,213,617

UNITED STATES PATENT OFFICE 2,213,617

ROTARY TRANSMISSION OR BRAKE

Russell D. Semon, Medford, Oreg.

Application August 5, 1939, Serial No. 288,596

7 Claims. (Cl. 192—60)

This invention relates to a clutch, brake, transmission device, or the like, and, in certain respects, hereinafter set forth, is in the nature of an improvement on the device disclosed in my co-pending application for patent, Ser. No. 251,129, filed January 16, 1939.

The objects of this invention are to provide a more simple device than heretofore, in which oil is used as a medium for establishing a driving connection between a driving and a driven member, and in which device the oil is controlled more positively and uniformly under all conditions of operation, than heretofore. Other objects and advantages will appear in the annexed drawings and description.

Fig. 4 is a sectional view through part of my device illustrating certain ports more fully described hereafter.

Figure 1:
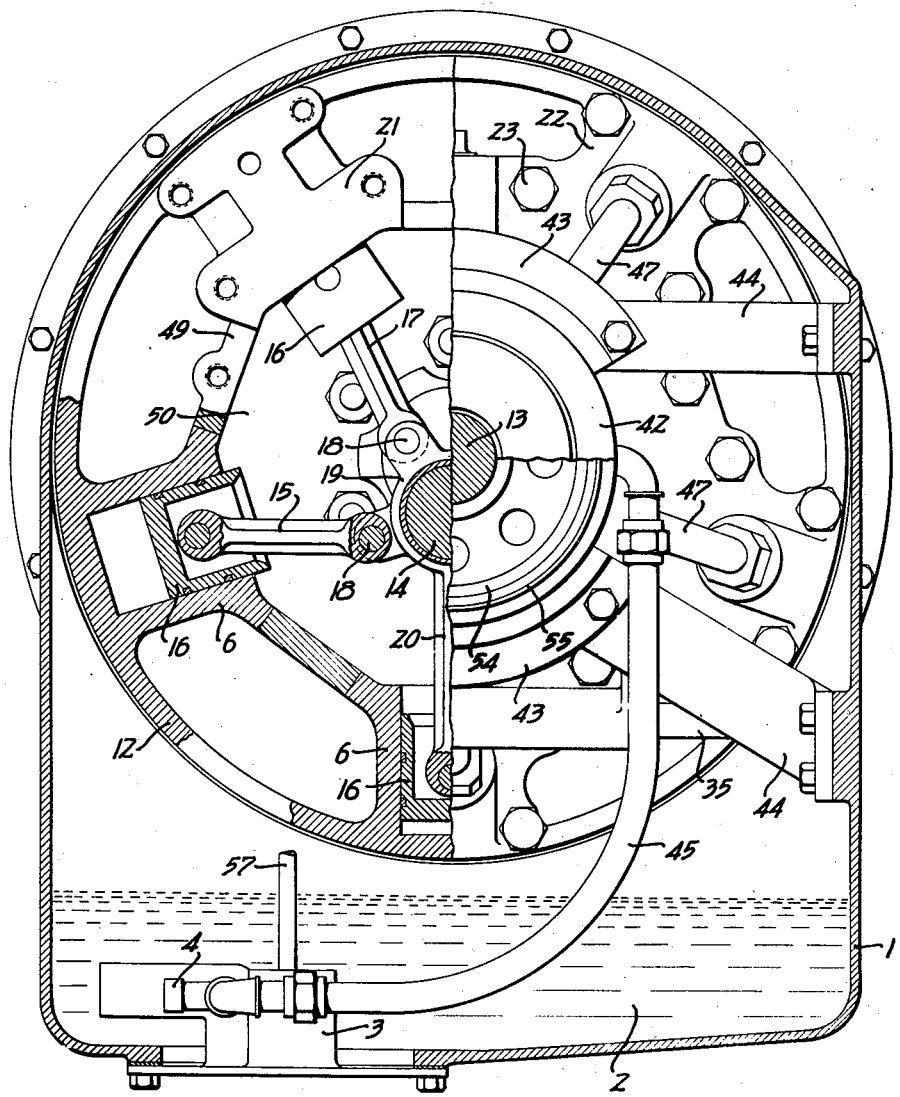
Fig. 1 is a vertical sectional view of my device with several quarters of one side broken away in separate parallel planes for the purpose of more clearly showing the construction of the device.

In detail the device as illustrated in the drawings is shown enclosed within a housing 1, which housing is formed to provide an oil reservoir, or sump 2 in the lower portion of said housing. In said reservoir is positioned a conventional gear pump 3, having a conventional oil or liquid pressure relief valve 4 in the pressure line leading from the discharge side.

The driving member and driven member in my device may, of course, be reversed, the driving member becoming the driven member, but for the pupose of description, the driving member generally designated 5, (Fig. 2) comprises a plurality of radially disposed cylinders 6 integrally secured by a web 7, or any other suitable means, to a central annular member 8. Said member 8 carries a conventional ball bearing 9 centrally therein and the annular member 8 is secured by bolts 10 to a power shaft 11, which power shaft may be an engine crank shaft, or any suitable, rotary power driven member. The outer ends of the cylinders are connected by arcuate continuations 12 of the cylinder heads extending from opposite sides of said heads, whereby such continuations, with said heads, virtually form an annular ring extending completely around the radially disposed cylinders.

The driven member comprises a shaft 13 in axial alignment with shaft 11. Said shaft 13 is formed with a crank 14 with an extension 15 at the side of said crank opposite shaft 13 rotatably supported in bearing 9. The main shaft 13, that extends away from the crank in direction outwardly of the row of cylinders, rotatably extends through a side of housing 1 to any suitable point for doing work.

Five equally spaced cylinders 6 are shown in the drawings, although this number may be varied. In each cylinder is a reciprocable piston 16, having an imperforate head, and the pistons may or may not be provided with conventional oil rings. Four of the five pistons have connecting rods 17 pivotally connected to the wrist pins therein, which rods are pivotally connected at their opposite ends, at 18, to a block 19 on crank 13. The fifth rod 20 is rigidly secured at its end opposite the piston to said block. Thus, upon revolution of the crank, or upon revolution of the cylinders about said crank, said pistons will reciprocate in said cylinders, but in a manner whereby the total area in the cylinders outwardly of the pistons is substantially constant at all times. This manner of movement is similar to that in radial engines, in which there is an outward movement of one or several pistons corresponding to inward movement of others.

The axially facing sides of the cylinders that face away from shaft 11, are provided with flat surfaces as indicated at 21, in Fig. 1, to provide for bolting plates 22 thereto by bolts 23. The plates 22 extend radially outwardly of one end of a hollow shaft 24 that surrounds shaft 13. The sides of shaft 13 are spaced from the inner sides of the shaft 24 to provide an oil duct 25 between shaft 13 and shaft 24. Adjacent crank 14 a ball bearing 26 rotatably supports shaft 24 on shaft 13, said bearing being spaced at 27 from the end of said shaft 24 to enable oil to pass through the bearing into space 27 and from the latter space into duct 25 for passage through said duct. The outer end of shaft 24 terminates within housing 1, hence the oil passing through said duct 25 will flow back into reservoir 2. Shaft 24 is also formed with a cylindrical chamber 28, closed at opposite ends. Chamber 28 extends circumferentially around shaft 13, the inner wall of said chamber forming a partition between space 27 and said chamber, and the outer wall 29 of said chamber being spaced around shaft 24, which latter shaft is the inner wall of chamber 28.

The outer wall 29 of chamber 28, which wall has also been designated as shaft 24, is formed with five equally spaced ports 30 in an annular row therearound, one of said ports being opposite each cylinder 6, and a sleeve valve block 31, slidable on cylindrical wall 29, longitudinally thereof, extends across the row of ports 30. A pair of annular oil sealing expansible spring elements 32 are supported in annular recesses formed in the outer side of wall 29, at opposite sides of said row to prevent leakage of oil or a liquid adapted to pass through or into said ports, from chamber 28, past said rings.

Figure 2:
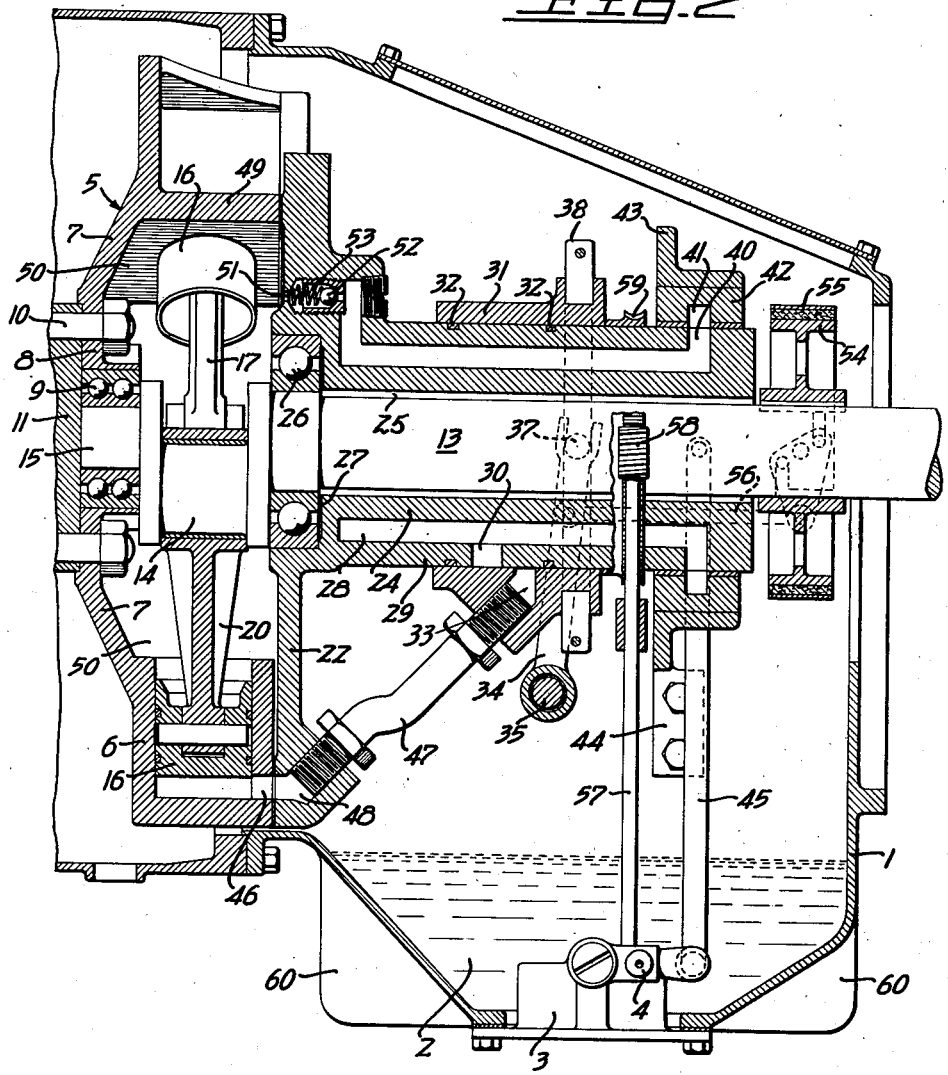
Fig. 2 is a vertical sectional view taken through the device perpendicular to the view in Fig. 1, showing one portion in dot-dash line to indicate a part that is between the plane of the section and the observer.

The block 31 is formed with openings 33 therein, which openings are likewise positioned opposite cylinders 6, so that upon sliding block 31 longitudinally of wall 29 in one direction and to the position indicated in Fig. 2, the body of the block 31 at one side of the row of openings 33 therein, will cover the ports 30, but upon sliding the block in the opposite direction, and generally toward the cylinders 6, the openings 33 will register with ports 30.

Figure 3:
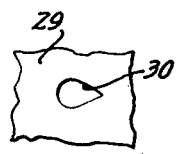
Fig. 3 is a fragmentary enlarged view of one of the oil ports in the system.

The sides of ports 30 in wall 29 preferably extend convergently from the ends thereof nearest the cylinders 6 in direction away from said cylinders as indicated in Fig. 3, while openings 33 are circular, thus, when the block 31 is moved toward the cylinders to a position in which ports 39 are in registration with openings 33, such movement will cause a gradual opening of said ports. The movement of block 31 on wall 29 is adapted to be effected by a yoke 34 (Fig. 2) secured on shaft 35, which latter shaft rotatably extends through a side of housing 1 for connection outside said housing with any desired control means for causing rotation of said shaft. The arms of yoke 34 extend to opposite sides of block 31 and the other ends of said arms are recessed at 36 to receive pins 37 projecting outwardly of a slip ring 38 rotatably mounted in an outwardly opening annular recess formed in the outer side of said block.

The outer end of the cylindrical outer wall 29 of chamber 28 is provided with a row of oil inlet openings 40 communicating with an annular recess 41 in a ring 42, which ring is supported in bearing segments 43 carried in brackets 44 that are secured to the sides of housing 1. Connecting between the oil pump 3 and said annular recess 41 is oil line 45, for supplying oil under pressure, to recess 41 for passage through ports 40 to chamber 28 and to ports 30 for passage into openings 33 when said ports 30 and openings 31 are in registration with each other.

Adjacent the outer ends of each of the cylinders 6, and at all times outwardly of the heads of pistons 16, when the latter are at the outermost ends of their strokes, each of said cylinders is provided with an opening 46. Each of the openings 46 connects with one of the openings 33 for carrying the oil from chamber 28 to the outer ends of said cylinders wherever the ports 30 and openings 33 are in registration. The connections between said openings 46 and openings 33, is effected by conduits 47, one end of each conduit 47 being secured in one of the openings 33 and the opposite ends being secured in openings 48 in plates 22, which latter openings are in registration with openings 46. The conduits 47 are preferably flexible steel or metal of conventional construction for carrying oil under pressure, thus permitting movement of the valve block 31 relative to plates 22.

The plates 22 completely close one side of the area radially inwardly of the cylinders, and are integral with the cylindrical walls 24, 29 through which shaft 13 passes, while the web 7 closes the opposite side of said area and walls 49, extending between the adjacent cylinders of each pair, and integral with said cylinders and web 7, provides for fully enclosing said area, to form an inner chamber 50 into which the inner ends of the cylinders 6 open.

The chamber 50 communicates with chamber 28 by a duct 51, in which is a pressure relief valve 52 adapted to close against the flow of liquid from chamber 50 into chamber 28, but which may open to flow of fluid in the opposite direction when the pressure in chamber 28 is sufficient to overcome the resistance of coil spring 53.

The shaft 13 also carries a brake drum 54 having a brake drum 55 therein adapted to be actuated for stopping rotation of shaft 13 when ports 30 and openings 33 are in full registration. This actuation of said brake band, is effected upon movement of yoke 34 through a link 56 pivotally connecting the brake band with said yoke. The brake band, drum, and link connection are of conventional construction, hence are not shown in great detail, since the said construction is familiar to anyone experienced in the art of brakes.

The oil pump 3 is driven by a shaft 57, said shaft carrying a gear 58 at one end in mesh with gear 59 secured to the outer cylindrical wall 31 of chamber 28.

In operation, the rotation of shaft 11 will cause the cylinders 6 and walls 24, 29 of the chamber 28, and conduits 47, to revolve therewith. However, when ports 30 and openings 33 are in full registration, the pistons 16, crank 14 and shaft 13 will remain stationary, but there will be reciprocation of said cylinders and pistons relatively, and the oil in some of said cylinders will merely be moved into chamber 28 and onto the others of said cylinders, according to how the relative movement between the cylinders and pistons occurs during revolution of the cylinders. Since pump 3 is always operative while shaft 11 is revolving, the oil pumped into chamber 28 may pass valve 52 and into chamber 50, for return to reservoir 2 through bearing 26 and passage 25. Upon closing ports 30 by the valve block 31, it is obvious that a resistance will occur to the flow of oil from the portions of said cylinders outwardly of said pistons, into chamber 28, and this will result in rotation of shaft 13, when such resistance overcomes the load on shaft 13. When ports 30 are fully closed by valve block 31, it is obvious that a direct drive will be established between shafts 11, 13, and the latter will revolve at substantially the same speed as shaft 11.

It will be observed that a portion of the oil in chamber 28 is always being forced into chamber 50 and back to the reservoir through duct 25 during rotation of the drive member and that practically all of the oil in each cylinder, is with each outward stroke of the piston therein forced into said chamber 28. Thus detriment to the oil is eliminated, since the oil passing into chamber 28 as well as into the reservoir is given a chance to cool. While not absolutely necessary, I may provide cooling fins 60 on the outer side of the lower portion of housing 1.

The foregoing construction is believed to be particularly novel in the means provided for controlling the flow of oil to and from the cylinders, since heretofore, individual valves for each cylinder, have been used, and where such valves are used, it is practically impossible to procure the desired uniformity of seal required. Also the use of individual valves, is prohibitive in expense.

The chamber 28 can be made large or small, as desired, but is preferably sufficiently large to carry a surplus over that required to receive the oil as it is displaced by outward movement of the pistons in the cylinders and since this oil, as displaced into said chamber through conduits 47, passes back into the chamber 28 where it mixes with incoming cooler oil from the reservoir and is caused to pass both into cylinders in which the pistons are moving radially inwardly and into chamber 50 for return to the reservoir.

Having described my invention, I claim:

1. In a device of the character described, a rotatably supported shaft provided with a crank, a plurality of radially extending pistons connected with said crank, cylinders within which said pistons are reciprocably mounted, a central crank housing enclosing said crank and the inner ends of said cylinders, a first reservoir for liquid extending around said shaft and at one side of said cylinders, conduits communicating between said reservoir and the outer end of said cylinders, respectively, a single, annular valve member extending around said shaft movable to positions opening and closing said conduits to flow of liquid from said reservoir to said cylinder, a second reservoir for liquid, means for conducting liquid from said second reservoir to said first reservoir for passage of said liquid from said first reservoir through said conduits to said cylinders, a pump for causing said liquid to be so conducted under pressure, and means mounting said cylinders for revolving about the axis of said shaft.

2. In a device of the character described, a rotatably supported shaft provided with a crank, an annular row of radially extending pistons connected with said crank, cylinders within which said pistons are reciprocably mounted, a central crank housing enclosing said crank and the inner ends of said cylinders to form a central reservoir for liquid around said crank into which the inner ends of said cylinders open, an annular reservoir at one of the lateral sides of said cylinders extending around the row of cylinders, conduits for liquid communicating between said annular reservoir and the ends of said cylinders outwardly of said pistons, an annular valve movable axially of said shaft to positions simultaneously opening and closing said conduits to flow of liquid from said annular reservoir to said cylinders, a main supply reservoir for liquid, means for conducting liquid from said supply reservoir to said annular reservoir and to said central reservoir for passage of said liquid into said central reservoir and into said annular reservoir for passage of the liquid to opposite ends of said pistons, a pump for causing said liquid to be so conducted under pressure, and means mounting said cylinder for revolving about the axis of said shaft.

3. In a device of the character described, a rotatably mounted shaft provided with a crank, an annular row of radially extending imperforate headed pistons connected with said crank, cylinders within which said pistons are reciprocably mounted, a central crank housing enclosing said crank and the inner ends of said cylinders to form a central reservoir for oil around said crank and into which the inner ends of said cylinders open, means for simultaneously supplying oil under pressure to within said central crank housing and to the cylinders outwardly of said pistons, said means including a pump and conduits extending therefrom to said crank housing and cylinders, means for conducting the oil from said central reservoir back to said pump for thereby providing for the circulation of oil through said reservoir while oil is supplied by said pump to the ends of said cylinders outwardly of said pistons, means mounting said cylinders for revolving about the axis of said shaft.

4. In a device of the character described a rotatably mounted shaft provided with a crank, an annular row of radially extending pistons connected with said crank, cylinders within which said pistons are reciprocably mounted, a central crank housing enclosing said crank and the inner ends of said cylinders to form a central reservoir for oil around said crank and into which the inner ends of said cylinders open, a main supply reservoir for oil, an auxiliary reservoir separate from said supply reservoir, a pump and oil line for supplying oil, under pressure from said supply reservoir to said auxiliary reservoir, the outer wall of said auxiliary reservoir being provided with an opening for each of the cylinders and a passageway communicating between each of said openings and the outer end of each cylinder, a single valve member slidably supported against said outer wall of said auxiliary reservoir positioned for slidable movement from a position closing said openings to a position uncovering said openings, means for causing said movement, and means mounting said cylinders for revolution about the axis of said shaft.

5. In a device of the character described, a rotatably supported shaft provided with a crank, a plurality of radially extending pistons connected with said crank, cylinders within which said pistons are reciprocably mounted, a central crank housing enclosing said crank and the inner ends of said cylinders, an annular chamber around said shaft concentric therewith and adjacent one of the lateral sides of the row of cylinders, a main oil supply reservoir, means for supplying oil under pressure from said supply reservoir to said annular chamber and to the interior of said housing, conduits communicating between said annular chamber and the ends of said cylinders outwardly of said pistons respectively for supplying oil to said cylinders outwardly of the pistons, a passageway communicating between said supply reservoir and the interior of said housing for passing oil from within said housing back to said supply reservoir, and valve means for controlling the flow of oil through said conduits to said cylinders.

6. In a device of the character described, a rotatably supported shaft provided with a crank, a plurality of radially extending pistons connected with said crank, cylinders within said pistons are reciprocably mounted, an annular chamber around said shaft positioned coaxially therewith, an oil supply reservoir, means for supplying oil under pressure from said reservoir to said annular chamber, passageways for conducting oil from said chamber to the ends of said cylinders that are disposed outwardly of said pistons, means for controlling the flow of oil from said chamber to said cylinders, including openings in the outer wall of said chamber and an annular valve member reciprocably mounted on said wall for movement axially thereof to and from a position covering said openings, said openings communicating with said conduits when the valve member uncovers the said openings and the communication between the openings and conduits being closed when the valve member closes said openings, said openings being in a row extending circumferentially around said outer wall and an expansible spring ring at each of the opposite sides of said row disposed between said wall and said valve member for sealing the space between said rings against leakage therepast.

7. In a device of the character described that includes a plurality of cylinders open at their inner ends and closed at their outer ends, said cylinders extending radially of a central axis and imperforate headed pistons reciprocable in said cylinders, a housing arranged and adapted to contain a liquid into which said inner ends open enclosing said inner ends, a source of liquid under pressure separate from said housing, liquid inlets in the outer ends of said cylinders outwardly of said pistons, a passageway extending from said source to each of said inlets, an annular valve member concentric with said central axis and disposed at one side of said housing, said passageways being positioned relative to said valve member for simultaneous opening of said passageways to flow of liquid from said source to said cylinders upon predetermined movement of the valve member in one direction and for closing said passageways to said flow of liquid upon movement of said member in the opposite direction, a conduit establishing communication between said source and said housing, a check valve in said conduit adapted to open the conduit to flow of liquid from said source into said housing upon a predetermined pressure of said liquid, and an outlet for liquid from said housing, said outlet being spaced a substantial from the lowermost side of said housing whereby a substantial amount of liquid is maintained in the portion of said housing below said outlet at all times.

RUSSELL D. SEMON.